(12) United States Patent
Oohira

(10) Patent No.: US 9,395,567 B2
(45) Date of Patent: Jul. 19, 2016

(54) DISPLAY DEVICE AND LIQUID CRYSTAL DISPLAY DEVICE THAT PREVENT CRACKING OF A DISPLAY PANEL WITHOUT INCREASING IN SIZE

(71) Applicant: Japan Display Inc., Tokyo (JP)

(72) Inventor: Eiji Oohira, Tokyo (JP)

(73) Assignee: Japan Display Inc., Tokyo (JP)

( * ) Notice: Subject to any disclaimer, the term of this patent is extended or adjusted under 35 U.S.C. 154(b) by 160 days.

(21) Appl. No.: 14/250,498

(22) Filed: Apr. 11, 2014

(65) Prior Publication Data

US 2014/0313453 A1      Oct. 23, 2014

(30) Foreign Application Priority Data

Apr. 19, 2013   (JP) .................................. 2013-088740

(51) Int. Cl.
| | |
|---|---|
| *G02F 1/1333* | (2006.01) |
| *G06F 1/16* | (2006.01) |
| *H04M 1/02* | (2006.01) |
| *F21V 8/00* | (2006.01) |
| *H04M 1/22* | (2006.01) |

(52) U.S. Cl.
CPC ........ *G02F 1/133308* (2013.01); *G06F 1/1643* (2013.01); *H04M 1/0266* (2013.01); *G02B 6/0051* (2013.01); *G02B 6/0053* (2013.01); *G02B 6/0088* (2013.01); *G02F 2001/133314* (2013.01); *G02F 2001/133331* (2013.01); *H04M 1/22* (2013.01)

(58) Field of Classification Search
CPC .......... G02F 1/133308; G02F 1/33608; G02F 2001/133314; G02F 1/1333; G02F 2201/465; G02F 2001/133322; G02F 2201/503; G02F 2001/133317; G02F 1/133524
See application file for complete search history.

(56) References Cited

U.S. PATENT DOCUMENTS

| | | | | |
|---|---|---|---|---|
| 8,469,581 | B2 * | 6/2013 | Matsuo ............. | G02F 1/133608 349/61 |
| 8,625,043 | B2 * | 1/2014 | Hwang ............. | G02F 1/133308 349/56 |
| 2003/0058380 | A1 * | 3/2003 | Kim .................. | G02F 1/133308 349/58 |
| 2008/0129915 | A1 * | 6/2008 | Fukuda ............. | G02F 1/133308 349/58 |
| 2010/0245706 | A1 | 9/2010 | Oohira | |

FOREIGN PATENT DOCUMENTS

JP        2010-224234        10/2010

* cited by examiner

*Primary Examiner* — Huyen Ngo
(74) *Attorney, Agent, or Firm* — Typha IP LLC

(57) ABSTRACT

A liquid crystal display device is provided that prevents the cracking of a display panel without an increase in size. The liquid crystal display device includes a liquid crystal display panel, a cover plate arranged to face a surface of the liquid crystal display panel on which an image is displayed, and a backlight arranged to face a back surface of the liquid crystal display panel. The backlight includes a frame facing a peripheral part of the back surface of the liquid crystal display panel. The liquid crystal display panel has a planar shape in which at least one corner part of a rectangle is cut away. The frame includes a columnar part which rises in a direction toward the cover plate and fits in an area where the at least one corner part is cut away.

11 Claims, 5 Drawing Sheets

DISPLAY DEVICE AND LIQUID CRYSTAL DISPLAY DEVICE THAT PREVENT CRACKING OF A DISPLAY PANEL WITHOUT INCREASING IN SIZE

CROSS-REFERENCE TO RELATED APPLICATION

The present application claims priority from Japanese application JP2013-88740 filed on Apr. 19, 2013, the content of which is hereby incorporated by reference into this application.

BACKGROUND OF THE INVENTION

1. Field of the Invention

The present invention relates to a display device such as a liquid crystal display device 2. Description of the Related Art In a display device (for example, a liquid crystal display device), a structure is known in which a cover plate made of acrylic resin or reinforced glass is bonded to the whole surface of a display panel (for example, a liquid crystal display panel) by an adhesive layer. In the liquid crystal display panel, one of substrates sandwiching a liquid crystal material protrudes from the other. An integrated circuit chip is mounted on the protruding substrate and a flexible wiring substrate is connected. The cover plate is generally larger than the liquid crystal display panel. When external force to sandwich the protruding substrate of the liquid crystal display panel and the cover plate is applied, a crack occurs at a boundary between the protruding substrate of the liquid crystal display panel and the other substrate.

JP 2010-224234 A discloses that a wall is formed to rise from the frame attached to the liquid crystal display panel, and this is bonded to the cover plate. According to this, since the wall functions as a spacer between the protruding substrate of the liquid crystal display panel and the cover plate, the crack of the substrate can be prevented.

The structure disclosed in JP 2010-224234 A assumes that the frame is sufficiently larger than the liquid crystal display panel. However, in a small liquid crystal display device for a cellular phone or a mobile terminal, since the frame is very small, it is difficult to provide the wall.

SUMMARY OF THE INVENTION

The invention has an object to provide a liquid crystal display device in which a crack of a display panel can be prevented without increasing the size.

(1) According to an aspect of the invention, a liquid crystal display device includes a liquid crystal display panel, a cover plate arranged to face a surface of the liquid crystal display panel on which an image is displayed, and a backlight arranged to face a back surface of the liquid crystal display panel. The backlight includes a frame facing a peripheral part of the back surface of the liquid crystal display panel. The liquid crystal display panel has a planar shape in which at least one corner part of a rectangle is cut away. The frame includes a columnar part which rises in a direction toward the cover plate and fits in an area where the at least one corner part is cut away. According to the invention, since the columnar part rises in the direction toward the cover plate, the liquid crystal display panel is supported and its crack can be prevented. The liquid crystal display panel has the planar shape in which the corner part of the rectangle is cut away, and the columnar part fits in the area of the cut-away corner part, the liquid crystal display device does not become large.

(2) In the liquid crystal display device as recited in (1), it is preferable that the liquid crystal display panel includes a first substrate facing the cover plate and a second substrate facing the backlight, the first substrate and the second substrate overlap each other in a state where a part of the second substrate protrudes from the first substrate, and constitute the planar shape of the liquid crystal display panel, and a portion of the second substrate protruding from the first substrate has a shape in which the at least one corner part is cut away.

(3) In the liquid crystal display device as recited in (2), it is preferable that the columnar part is higher than the first substrate.

(4) In the liquid crystal display device as recited in any one of (1) to (3), it is preferable that a light-shielding layer is provided on a surface of the cover plate facing the liquid crystal display panel, the columnar part faces the light-shielding layer, and a protecting film is provided in an area of the light-shielding layer facing the columnar part.

(5) According to a second aspect of the invention, a display device includes a display panel, a cover plate arranged to face a surface of the display panel on which an image is displayed, and a frame arranged to face a back surface of the display panel and supporting the display panel. The display panel includes at least one cut-away part in which a corner part is cut away. The frame includes a columnar part which is adjacent to the cut-away part and rises in a direction toward the cover plate in an area of the corner part. A height of the columnar part is higher than a position of the surface of the display panel.

DETAILED DESCRIPTION OF THE INVENTION

Hereinafter, an embodiment of the invention will be described with reference to the drawings.

Figure 1:
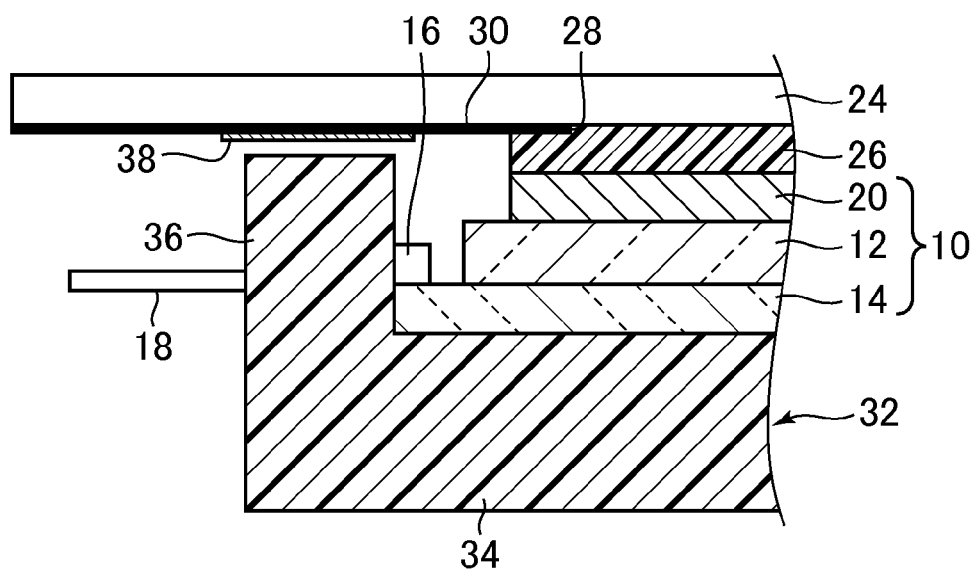
FIG. 1 is a sectional view showing a liquid crystal display device of an embodiment of the invention.

FIG. 1 is a sectional view showing a display device of an embodiment of the invention. FIG. 1 shows a liquid crystal display device as an example of the display device. The liquid crystal display device includes a liquid crystal display panel 10. The liquid crystal display panel 10 includes a first substrate 12 and a second substrate 14. A not-shown liquid crystal intervenes between the first substrate 12 and the second substrate 14. The first substrate 12 is a color filter substrate provided with a not-shown color filter. The second substrate 14 is a TFT (Thin Film Transistor) substrate (or an array substrate) including not-shown thin film transistors, pixel electrodes, wiring and the like.

Figure 2:
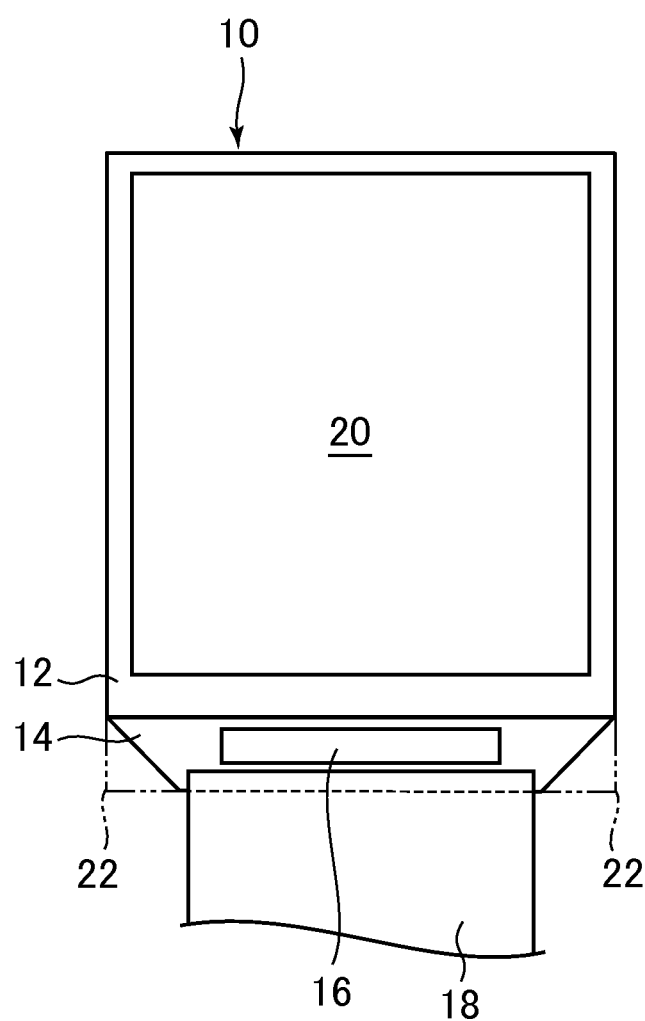
FIG. 2 is a plan view of a liquid crystal display panel.

FIG. 2 is a plan view of the liquid crystal display panel 10. The first substrate 12 and the second substrate 14 overlap each other in a state where a part of the second substrate 14 protrudes from the first substrate 12. The second substrate 14 includes a protrusion protruding from the first substrate 12. An integrated circuit chip 16 having a built-in driver circuit for driving the liquid crystal is mounted on the liquid crystal display panel 10 (particularly, the protrusion of the second substrate 14), and a flexible wiring substrate 18 for electrical connection with the outside is attached thereto. A polarization plate 20 is attached to the liquid crystal display panel 10.

As shown in FIG. 2, the first substrate 12 and the second substrate 14 constitute the planar shape of the liquid crystal display panel 10. The protrusion of the second substrate 14 from the first substrate 12 has a trapezoidal planar shape. In other words, the protrusion of the second substrate 14 from the first substrate 12 has such a shape that at least one (two in FIG. 2) corner part 22 of the rectangle is cut away. The planar shape of the whole liquid crystal display panel 10 is such a shape that at least one corner part 22 of the rectangle is cut away.

As shown in FIG. 1, the liquid crystal display device includes a cover plate 24 arranged to face the surface of the liquid crystal display panel 10 on which an image is displayed. The cover plate 24 is bonded to the liquid crystal display panel 10 (particularly, the polarization plate 20) by an adhesive layer 26. The cover plate 24 may be an reinforcing plate or a protecting plate made of glass, plastic or the like, or may be a touch panel. A light-shielding layer 30 including an opening 28 for displaying an image is provided on the surface of the cover plate 24 facing the liquid crystal display panel 10. The cover plate 24 faces the first substrate 12.

The liquid crystal display device includes a backlight 32 of, for example, an edge light system. The backlight 32 is arranged to face the back surface of the liquid crystal display panel 10. The backlight 32 faces the second substrate 14. The backlight 32 includes a not-shown light guide plate, and plural not-shown light-emitting parts such as light-emitting diodes are arranged in one line so as to face an end face of the light guide plate. The light-emitting parts are point light sources for introducing light to the light guide plate. The light from the point light sources is converted into surface light source by the light guide plate and is irradiated to the liquid crystal display panel 10. A not-shown optical sheet is arranged between the liquid crystal display panel 10 and the light guide plate. The optical sheet includes a diffusion sheet and a prism sheet.

The backlight 32 includes a frame 34 made of, for example, resin. The frame 34 houses the not-shown light guide plate therein. The frame 34 faces a peripheral part of the back surface of the liquid crystal display panel 10, and supports the liquid crystal display panel 10. The frame 34 integrally includes a columnar part 36 rising in a direction toward the cover frame 24. When an external force for sandwiching the liquid crystal display panel 10 (particularly the protrusion of the second substrate 14 from the first substrate 12) and the cover plate 24 is applied, the columnar part 36 can receive the external force, and a crack of the liquid crystal display panel 10 can be prevented. The columnar part 36 is higher than the first substrate 12. The columnar part 36 faces the light-shielding layer 30. A protecting film 38 made of metal or the like is formed in an area of the light-shielding layer 30 facing the columnar part 36. Accordingly, since the protecting film 38 intervenes between the light-shielding layer 30 and the columnar part 36, even when the light-shielding layer 30 is formed on the surface of the cover plate 24 by printing or the like, the light-shielding layer 30 is prevented from contacting the columnar part 36 and being scraped. Besides, a specified gap is provided between the protecting film 38 and the columnar part 36.

Figure 3:
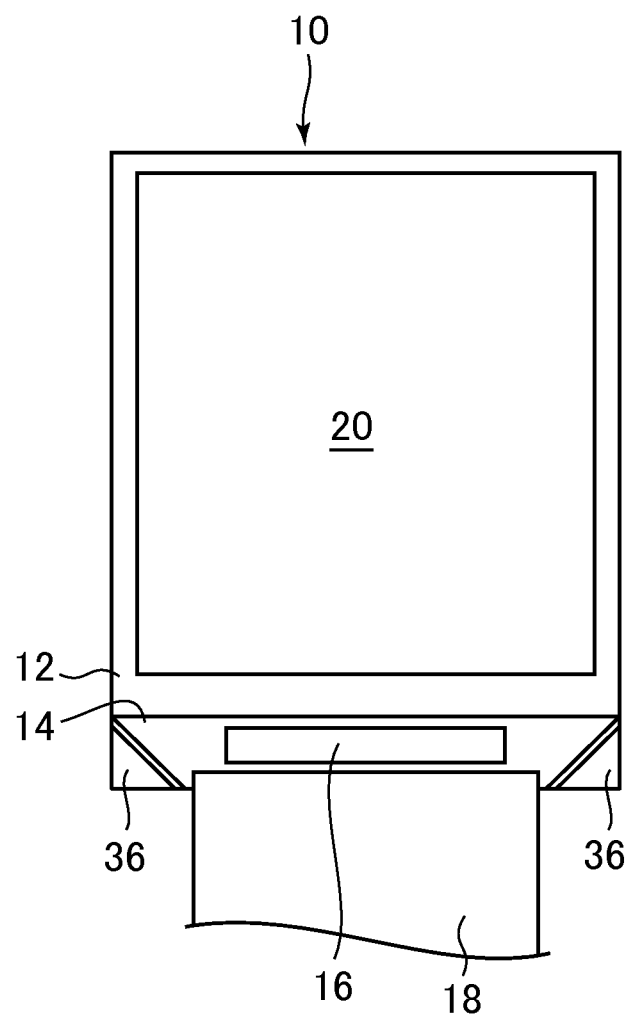
FIG. 3 is a plan view showing the liquid crystal display panel to which a frame is attached.
Figure 4:
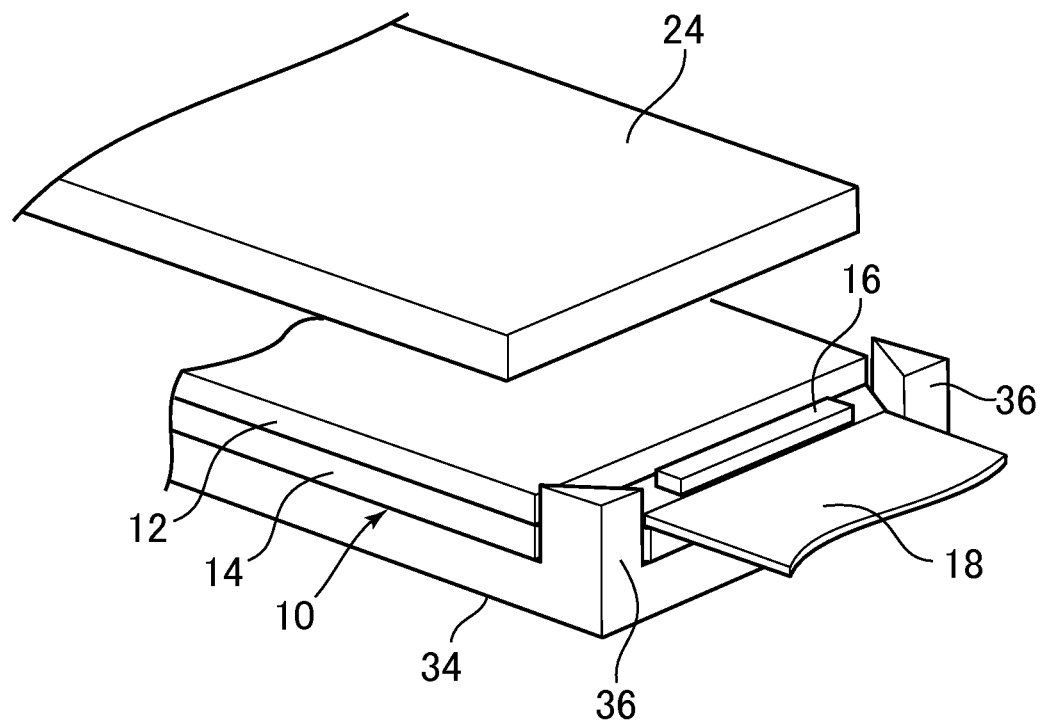
FIG. 4 is a decomposed perspective view of the frame to which the liquid crystal display panel is attached and a cover plate.
Figure 5:
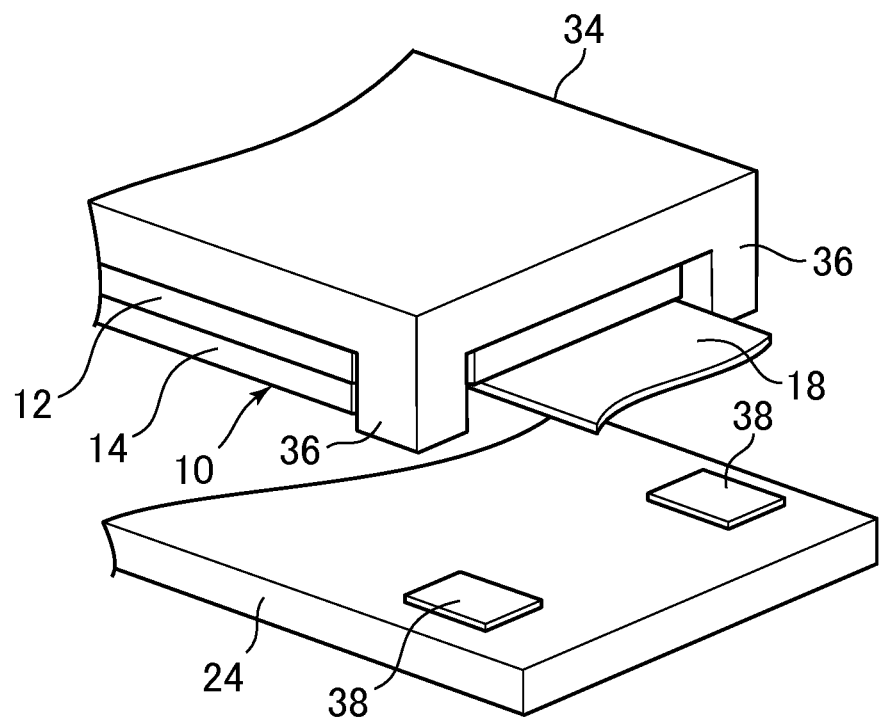
FIG. 5 is a decomposed perspective view seen in a direction different from FIG. 4.

FIG. 3 is a plan view showing the liquid crystal display panel 10 to which the frame 34 is attached. FIG. 4 is a decomposed perspective view of the frame 34 to which the liquid crystal display panel 10 is attached and the cover plate 24. FIG. 5 is a decomposed perspective view seen in a direction different from FIG. 4.

The columnar part 36 is provided to fit in an area of at least one corner part 22 (see FIG. 2) cut away from the rectangle. In this embodiment, although the columnar part 36 is a triangular prism, the shape is not particularly limited. Since the columnar part 36 fits in the area cut away from the rectangle, the liquid crystal display device is not enlarged.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
a liquid crystal display panel; a cover plate arranged to face a surface of the liquid crystal display panel on which an image is displayed; and
a backlight arranged to face a back surface of the liquid crystal display panel,
wherein
the backlight includes a frame facing a peripheral part of the back surface of the liquid crystal display panel,
the liquid crystal display panel has a planar shape in which at least one intermediate side is formed between a first side and a second side,
the intermediate side directly connects the first side and the second side,
a first angle between the intermediate side and the first side is larger than a right angle,
a second angle between the intermediate side and the second side is larger than a right angle, and
the frame includes a columnar part which rises in a direction toward the cover plate adjacent to the intermediate side.

2. The liquid crystal display device according to claim 1, wherein
the liquid crystal display panel includes a first substrate facing the cover plate and a second substrate facing the backlight,
the first substrate and the second substrate overlap each other in a state where a part of the second substrate protrudes from the first substrate, and constitute the planar shape of the liquid crystal display panel, and
a portion of the second substrate protruding from the first substrate has the intermediate side.

3. The liquid crystal display device according to claim 2, wherein the columnar part is higher than the first substrate.

4. The liquid crystal display device according to claim 1, wherein
a light-shielding layer is provided on a surface of the cover plate facing the liquid crystal display panel,
the columnar part faces the light-shielding layer, and a protecting film is provided in an area of the light-shielding layer facing the columnar part.

5. The liquid crystal display device according to claim 4, wherein the protecting film is made of a metal.

6. The liquid crystal display device according to claim 1, wherein a specified gap is provided between a surface of the columnar and the cover plate.

7. A display device comprising:
a display panel;
a cover plate arranged to face a surface of the display panel on which an image is displayed; and a frame arranged to face a back surface of the display panel and supporting the display panel, wherein the display panel includes a first substrate facing the cover plate and a second substrate facing the frame, the display panel includes at least one cut-away part in which a corner part is cut away, the frame includes a columnar part which is adjacent to the cut-away part and rises in a direction toward the cover plate in an area of the corner part, a height of the columnar part is higher than a position of the surface of the display panel, the second substrate includes a protrusion protruding from the first substrate, and the cut-away part is provided in the protrusion.

8. The display device according to claim 7, wherein the at least one cut-away part includes two cut-away parts are provided in the protrusion.

9. The display device according to claim 7, wherein a light-shielding layer is provided on a surface of the cover plate facing the display panel, the columnar part faces the light-shielding layer, and a protecting film is provided in an area of the light-shielding layer facing the columnar part.

10. The display device according to claim 9, wherein the protecting film is made of a metal.

11. The display device according to claim 7, wherein the columnar part has a surface facing the cover plate and a specified gap is provided between the surface of the columnar part and the cover plate.

* * * * *